United States Patent [19]

Boughton

[11] 4,345,704
[45] Aug. 24, 1982

[54] BOTTLE MOUNT AND BOTTLE FOR BICYCLES

[75] Inventor: Matthew S. Boughton, Stamford, Conn.

[73] Assignee: Cannondale Corporation, Stamford, Conn.

[21] Appl. No.: 298,641

[22] Filed: Sep. 2, 1981

[51] Int. Cl.³ ............................................. B62J 11/00
[52] U.S. Cl. .................................... 224/39; 224/148; 224/901; 220/85 H
[58] Field of Search .................. 224/148, 35, 901, 39; 211/71, 74; 248/102, 103, 104, 311.2, 311.3; 220/85 H; D9/337

[56] References Cited

U.S. PATENT DOCUMENTS

| | | | |
|---|---|---|---|
| 1,413,530 | 4/1922 | Harned | 224/39 R |
| 4,009,810 | 3/1977 | Shook | 224/39 |
| 4,095,812 | 6/1978 | Rowe | 224/148 X |
| 4,220,302 | 9/1980 | Hampton et al. | 224/901 X |

Primary Examiner—Steven M. Pollard
Attorney, Agent, or Firm—Brumbaugh, Graves, Donohue & Raymond

[57] ABSTRACT

A bottle mount and a bottle for bicycles comprises a mount for attachment to the bicycle having a concave surface that is a segment of a surface of revolution of a substantially straight line of not more than about 180 degrees in circumferential extent and a bottle having an external surface that is complementary to a concave surface of the mount. The concave surface of the mount and the complementary surface of the bottle have hook and loop cloth fastener elements affixed to them. A beverage in the bottle is discharged through a valved dispenser that is designed to be opened using the teeth.

9 Claims, 12 Drawing Figures

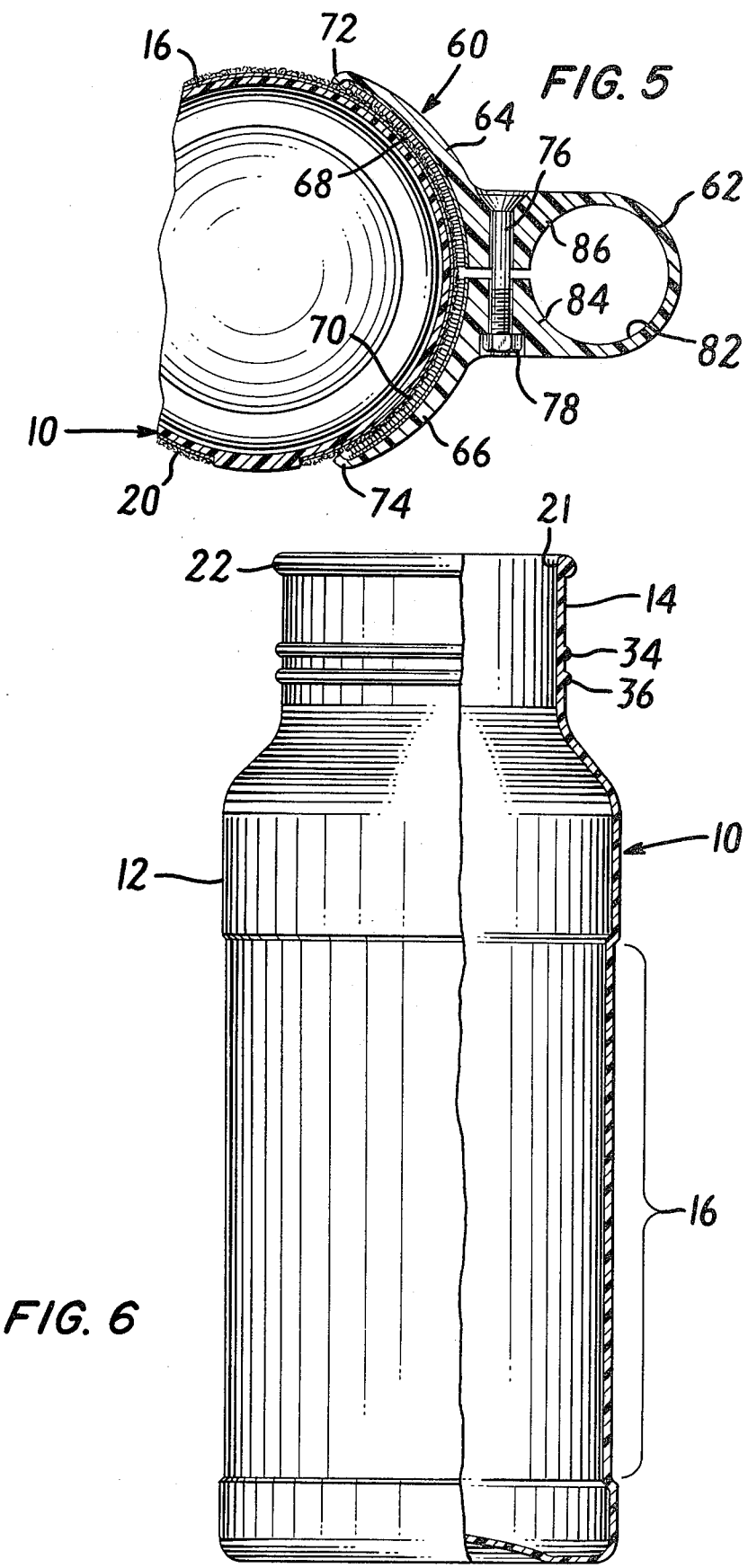

BOTTLE MOUNT AND BOTTLE FOR BICYCLES

BACKGROUND OF THE INVENTION

Bicycle riding has become very popular for transportation, recreation and exercise. Like all vigorous physical activities, bicycle riding makes the participant thirsty, and he or she will often want to have a few swallows of a refreshing beverage. Accordingly, many riders will take a beverage with them on the bicycle, especially if they are going on a long ride. Often, the rider will prefer not to stop to take a drink. In that case it is desirable the the beverage bottle be readily accessible and convenient to open.

Bottles and bottle mounts made especially for bicycles are available commercially. One type, the cage mount, is usually a simple wire holder or basket which can be affixed to the bicycle and receive a beverage container. In some cases, the container fits fairly loosely in the cage and presents a possibility that the container can fall out, especially when the bicycle is accidentally tipped over. The user may not observe that the container has fallen out, and it might be lost. In other cases, the bottle fits tightly within the cage, and although it is not as likely to fall out, it is fairly hard to remove. All cage-type mounts are hard to use because the rider has to line up the bottle with the cage opening before the container can be inserted into the cage. The rider may be distracted from proper operation of the bicycle in the course of replacing the bottle in the cage and faces some risk of an accident due to the distraction.

Another type of commercially available bottle mount comprises a bracket having a tapered dovetail slot and a bottle having a complementary dovetail rib. This type of holder is even more difficult to use than the cage type, inasmuch as the bottle must be turned about its axis and positioned with the dovetails aligned before it can be slided lengthwise into position. The difficulty of repositioning the bottle after it is used is a serious disadvantage and constitutes somewhat of a hazard to the bicyclist. The dovetail mount does, however, have the advantage of being a relatively small and lightweight form of connection between the bottle and the bicycle, as compared to the somewhat large, heavier cages.

SUMMARY OF THE INVENTION

There is provided, in accordance with the present invention, a bottle mount and bottle combination for bicycles that combines the advantages of comparatively small size, light weight and reliability and ease of use and, therefore, represents a substantial improvement over the prior art. The invention comprises a mount having a ring or other suitable device for connecting it to a frame tube or handlebars of the bicycle (preferably to the down tube), and a curved plate that defines a concave surface of revolution generated by a substantially straight line of not more than about 180 degrees in circumferential extent. One element of a hook and loop cloth fastener is affixed to the concave surface. The bottle comprises a receptacle having along at least a portion of its length an outer surface that is complementary throughout its circumferential extent to the concave surface of a mount. The other element of the hook and loop cloth fastener is affixed to at least part of the circumference of the complementary outer surface of the receptacle. The receptacle has an opening that receives a removable cap.

The invention is very easy to use, inasmuch as the bottle can be positioned in any circumferential orientation. Because the hook or loop element on the bottle extends around most of the outer surface of the receptacle, the user need only line up lengthwise the part of the bottle that is covered with a hook and loop cloth with the curved plate of the mount and push it toward the mount to engage the hook and loop cloth fastener. The hook and loop cloth fastener holds the bottle firmly nested on the mount; in fact, the strength of the attachment tends to increase during riding of the bicycle by virtue of the tendancy for vibration of the bicycle to engage more and more hook and loop elements. It is equally easy to remove the bottle from the mount; the rider need only reach down, grasp the neck of the bottle and pull it toward him. The neck is preferably of a comparatively substantial length, thereby providing leverage from the neck that helps in peeling the bottle from the mount.

In a preferred embodiment of the invention, the bottle further comprises a spout and a valve for a selectively opening and closing communication between the receptacle and the outlet from the spout. A type of spout-valve dispenser that is used in some liquid household detergent bottles is particularly suitable. Such a spout includes a cup-like element having a passage and is received on a flange on the bottle closure for movement generally toward and away from the closure. The valve includes a plug on the closure that enters and closes passage when the cup-like element is pushed toward the closure. Preferably, the cup-like element includes a flange that extends laterally outwardly with respect to the direction of movement of the element, thereby to facilitate opening the bottle by engaging the flange with the teeth. In this way, the rider is able to keep one hand on the handlebars while he takes a drink from the bottle.

It is generally best for the hook element of the hook and loop cloth fastener to be affixed to the mount and the loop element affixed to the bottle body. The loop element provides greater durability when handled and is also more comfortable to the hand when grasped. Both elements of the hook and loop cloth fastener can be adhesively affixed to the respective surfaces, and both elements are preferably bounded by shoulders to keep them from peeling away at the edges.

When the mount includes a ring for connecting it to a tube of the frame of the bicycle or the handlebars, preferably the down tube, it can, advantageously, be made in one piece, the ring being a flexible band that wraps around a tube. In this case the curved plate is actually a pair of curved plates, one of which is connected integrally to each end of the band. When the mount is placed on the tube, the inner edges of the two plates meet and define the aforementioned concave surface. A screw passes through portions of the piece adjacent the band, and a nut is threaded onto the screw to tighten the band onto the tube.

Some bicycles have fittings brazed to the down tube, and the mount can have lugs on the curved plate, instead of a ring, for connection to those fittings.

For a better understanding of the invention, reference may be made to the following description of an exemplary embodiment, taken in conjunction with the figures of the accompanying drawing.

DESCRIPTION OF THE DRAWINGS

FIG. 5 is a cross-sectional view of the embodiment taken generally along the lines 5—5 of FIG. 1 and in the direction of the arrows, and a portion being broken away to avoid unnecessary duplication;

FIG. 6 is a side elevational view of the receptacle, a portion being broken away in cross-section along a plane through the longitudinal axis;

DESCRIPTION OF THE EMBODIMENT

Figure 1:
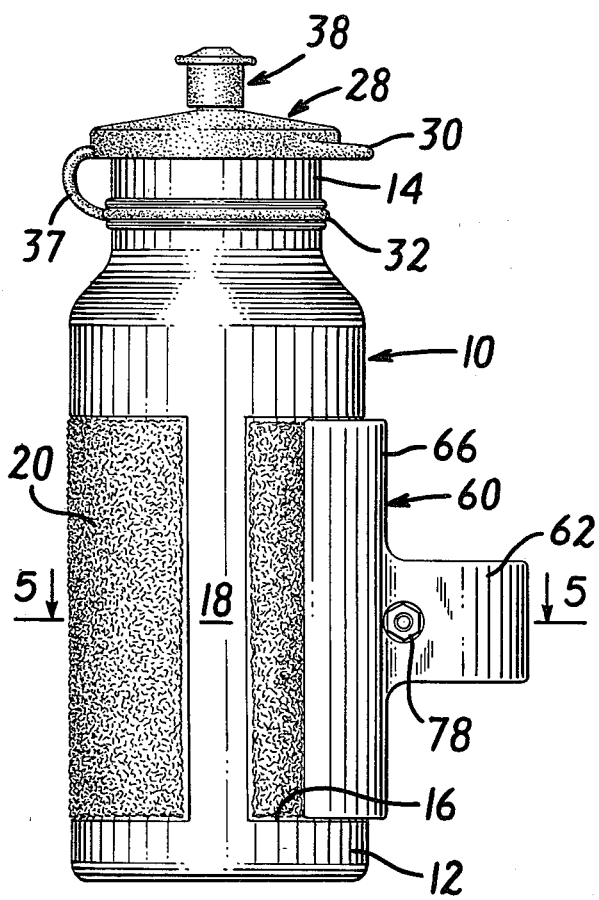
FIG. 1 is an elevational view of the embodiment.
Figure 2:
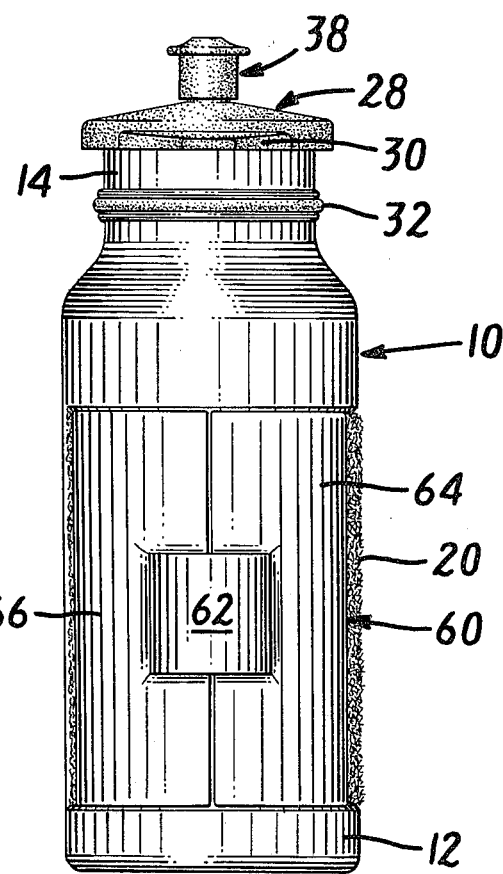
FIG. 2 is an elevational view of the embodiment viewed 90 degrees apart from the view of FIG. 1.
Figure 3:
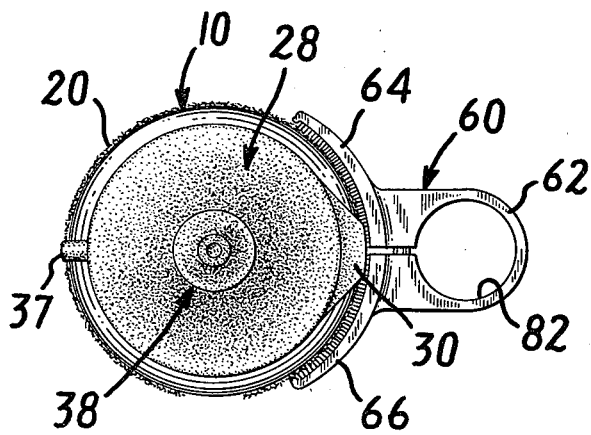
FIG. 3 is a top view of the embodiment.
Figure 4:
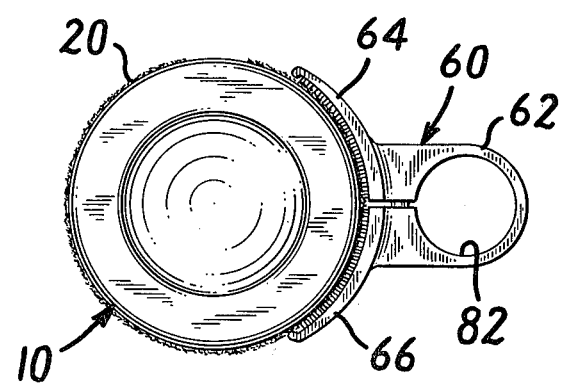
FIG. 4 is a bottom view of the embodiment.
Figure 8:
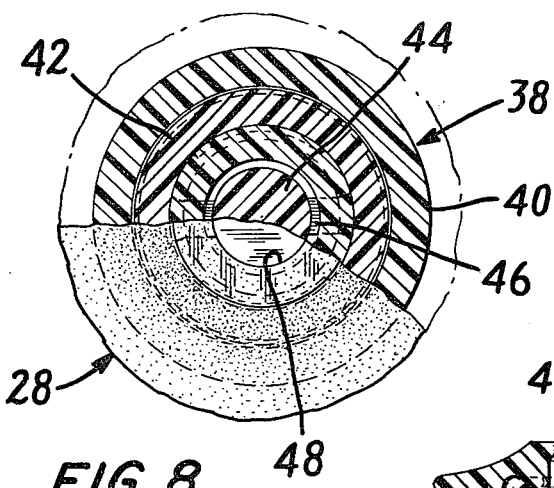
FIG. 8 is a fragmentary top view of the spout, a portion being broken away in cross section.

The receptacle 10 comprises a circular cylindrical body 12 that makes up the major portion of the vertical extent of the bottle and merges near the upper end to a neck portion 14 of somewhat lesser diameter than the body 12. The receptacle is molded plastic, and a shallow groove 16 is molded into the body over a substantial part of its length and a substantial part of its circumference, thereby leaving a narrow vertical band 18 along one side. The loop element 20 of a hook and loop cloth fastener is affixed by an adhesive within the groove 16. The affixation of the loop cloth strip(s) 20 within the groove 16 provides protection for the edges of the loop cloth by providing a bounding shoulder along all of the edges that considerably reduces the possibility of the edges gradually peeling away from the bottle as a result of handling or coming into contact with objects. The only reason for not having a groove or recess that extends entirely around the circumference of the bottle is basically an appearance feature; it would be quite difficult to maintain the required tolerances in the manufacture of the bottle and the loop cloth band to insure that the edges of the loop cloth will come together where they meet after wrapping around, and the band 18 avoids an unsightly gap between the abutting ends. The band section 18 can contact the mount fully (i.e., face it) without reducing the holding force enough to allow the bottle to fall off.

The upper end of the neck portion 14 of the receptacle defines a comparatively large opening 21 through which beverages and ice can be put in with ease. A bead 22 surrounds the opening and fits into an internal groove 24 located on the peripheral flange 26 of a snap-on type cap 28. A finger tab 30 projects from an edge of the flange 26 and facilitates removal of the cap. A ring 32 fits into a groove between a pair of beads 34 and 36 on the neck of the receptacle some distance below the upper edge and is connected by a flexible band 37 to the flange 26 of the cap 28. The ring and band 37 serve as a keeper for the cap 28 so that when it is removed, it is not separated from the receptacle and, therefore, cannot be lost.

Figure 7A:
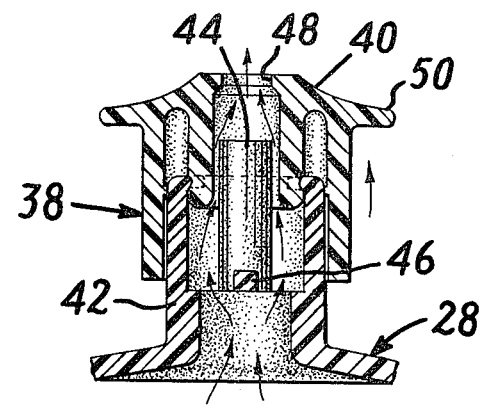
FIG. 7A is a detail side cross-sectional view of the spout in the open position.
Figure 7:
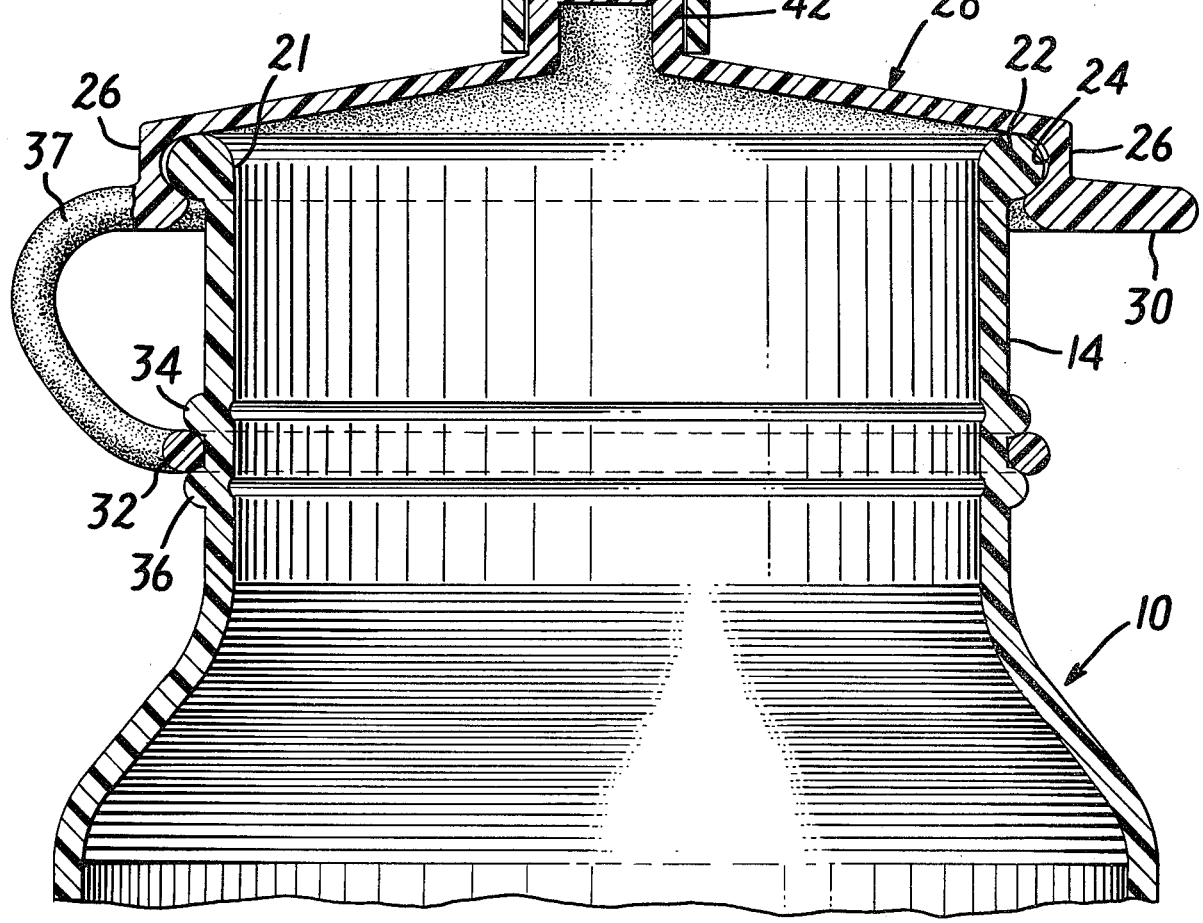
FIG. 7 is a side cross-sectional view of the neck portion of the bottle taken along a diametrical plane and on an enlarged scale.

The cap 28 includes a valve-type dispenser 38 of the type commonly used for some household detergent bottles. It includes a cup-like spout 40 that fits over an upwardly extending annular flange 42 molded onto the cap 28. A plug 44 extends up from a bridge 46 within the flange 42, and when the spout 40 is pushed toward the closure 28 the plug 44 fits into and forms a seal with the outlet opening 48 of the spout 40. As shown in FIG. 7A, the dispenser is opened by pulling the spout 40 away from the cap 28, thereby removing the plug 44 from the opening 48 and allowing liquid to flow from the bottle along the paths indicated by the arrows in FIG. 7A. Various retaining beads and grooves establishing the closed and opened positions of the spout are known per se and are, therefore, not described. The spout includes a flange 50 that projects out from the perimeter in a direction transverse to the direction of movement between opened and closed positions and is engageable by the teeth of the user to permit the bottle to be opened by grasping the receptacle with one hand and pulling it away from the mouth while holding the spout in the teeth. It can also, of course, be opened with the hand. The user can drink from the bottle and then reclose it by pressing the spout to the closed position with his teeth, chin, or hand (or anything else, for that matter).

The mount 60 for the bottle is molded in one piece from a suitable polymer and includes a band 62 that wraps around a frame tube, or handlebars (preferably the down tube), of the bicycle and a pair of curved plates 64 and 66 that extend outwardly from each end of the band 62 and have concave surfaces that match that of the body of the bottle 10. Strips 68 and 70 of the hook element of the hook and loop cloth fastener are adhesive affixed to the concave surfaces of the plates 64 and 66 and the outer edges of the strips are protected by shoulders 72 and 74 that keep the strips from peeling away along the edges in the course of handling or touching by objects. The mount 60 is molded with the plates 64 and 66 widely separated and the band completely flat. Accordingly, it is easily fitted to a frame tube of the bicycle and then wrapped to the fastened position shown in the drawings and clamped in that position to a frame tube by a screw 76 and a nut 78. The hole 82 defined by the band 62 and the bosses 84 and 86 by which the plates 64 and 66 are joined to the band can be of a diameter equal to the largest diameter down tube found in commercially available bicycles, and a strip (not shown) of suitable thickness can be wrapped as a bushing or a spacer around the tube within the hole 82 to fit the mount tightly to smaller diameter frame tubes while maintaining the desired radius of curvature of the concave surfaces 68 and 70.

Figures 9, 10:
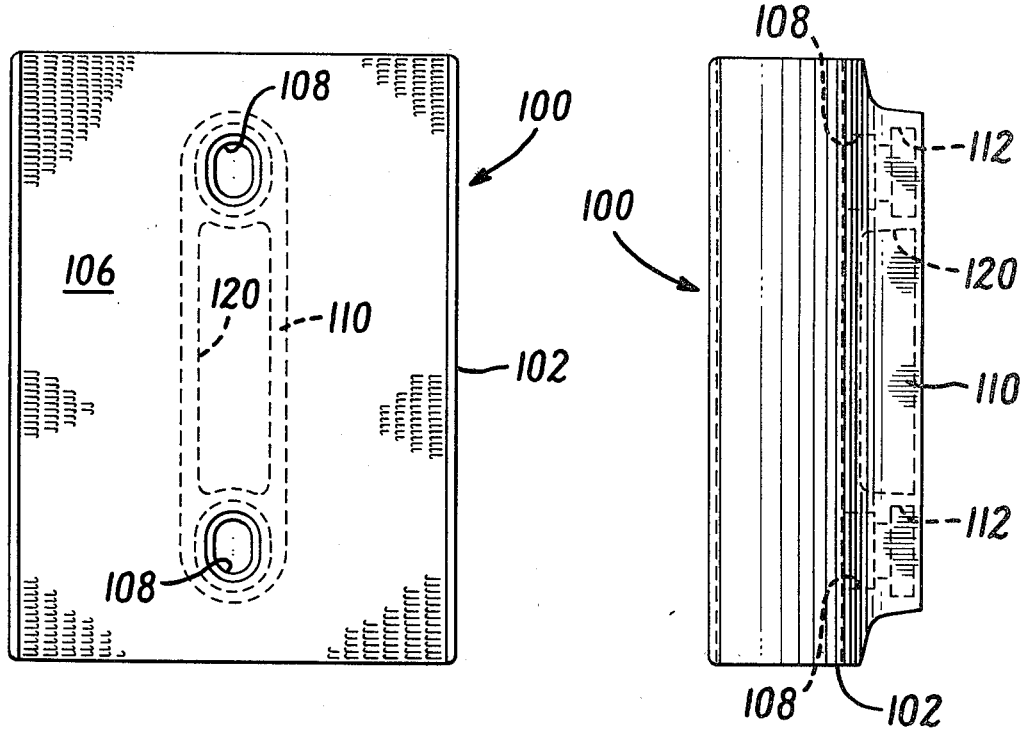
FIG. 9 is a plan view of another embodiment of a mount for the bottle.
FIG. 10 is a side-elevational view of the mount shown in FIG. 9.
Figure 11:
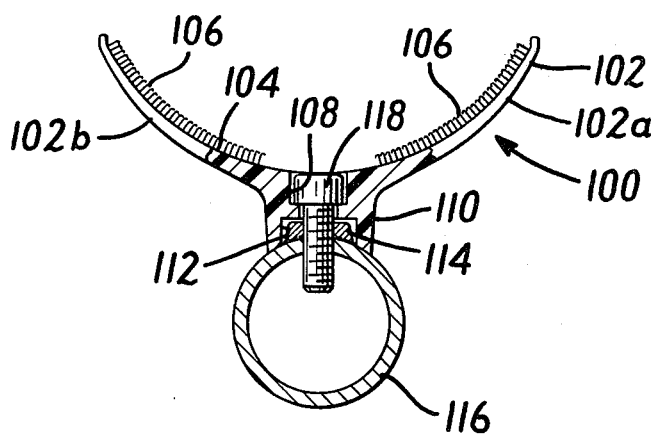
FIG. 11 is an end cross sectional view of the mount shown in FIGS. 9 and 10 with a portion broken away in cross section.

Some bicycles are manufactured with threaded bosses brazed on the upper side of the down tube. The embodiment of a bottle mount shown in FIGS. 9-11 of the drawings is intended for use on such bicycles. The mount 100 is molded in one piece from a suitable polymeric material and includes a cylindrical plate portion 102 comprising two arm portions 102a and 102b and having a concave upper surface 104. The arm portions 102a and 102b are covered with two strips of the hook cloth component 106 of a hook and loop coth fastener. Exposed between the strips of fastener 106 are recessed elongated holes 108 in the upper surface of a longitudinal flange 110 that projects down from the center of the cylindrical plate 102. Recesses 112 on the under side of the flange 110 accept the bosses 114 on the top side of the down tube 116, and screws 118 pass down through the holes 108 and are threaded into the bosses 114 to fasten the mount to the down tube. To minimize the weight and the cost of the mount, the center part of the flange 110 is cut away to leave a slot 120. The mount shown in FIGS. 9-11 is intended for use with the bottle shown in FIGS. 1-8, and the manner of use of the mount is in all respects, other then the way in which it is attached to bicycle, the same as the embodiment shown in FIGS. 1-8.

It is quite apparent that the bottle 10 can be pressed against the concave surface of the mount in any rotational position of the bottle about its lengthwise axis; in other words, the bottle does not have to be rolled to match it to the mount. The area of contact between the hook and loop cloth fastener elements is sufficiently large so that the user need not precisely locate the bottle in vertical register with the concave surface of the mount. The vibrations that result from the bicycle rolling along are sufficient to increase the force of attachment between the hook and loop cloth elements when the bicycle is ridden, and the bottle is very securely held in position on the mount. It has been demonstrated that an area of about 12 square inches of hook and loop cloth fastener is more than adequate to hold a filled 24-ounce capacity bottle on the mount.

The invention has numerous advantages. For one thing, the bottle is mounted on the bicycle in a position that makes it very convenient for the rider to reach down, grasp it at the neck portion 14, and peel it backward from the concave surface, a technique that provides leverage and reduces the force required to dislodge the bottle from the nested position in the mount. The mount is very light in weight and of small size. There is no need for the user to be especially attentive to lining up the bottle to replace it on the mount, a great advantage over the dove-tail type and cage-type mounts known in the prior art, and the position can be found by feel while the rider keeps his or her eyes on the road. The teeth-operated dispenser valve allows the rider to drink from the bottle with only one hand, and he can safely control the bicycle with his other hand while drinking. The bottle is easy to fill through a large opening, and the cap is linked to the bottle even when it is opened so that it cannot be lost.

Unlike metal cages, the plastic mount will not mar the finish of the bicycle and is far easier to attach than cages.

I claim:

1. A bottle mount and bottle combination for bicycles wherein the mount comprises means defining a concave surface that is a segment of a surface of revolution generated by a substantially straight line and is of not more than about 180 degrees in circumferential extent, one element of a hook and loop cloth fastener affixed to the concave surface, and means for fastening the mount to a bicycle with the concave surface facing generally upwardly, and wherein the bottle comprises a receptacle, a portion of the receptacle having an outer surface that is complementary throughout its circumferential extent to the concave surface of the mount and the other element of the hook and loop cloth fastener being affixed to said complementary portion of the receptacle, and a removable closure for the receptacle.

2. The combination claimed in claim 1 wherein the bottle further comprises a spout and valve dispenser means associated with the spout for selectively opening and closing communication between the receptable and the outlet from the spout.

3. The combination according to claim 2 wherein the spout is a cup-like element having a passage and is received on a flange on the closure for movement generally toward and away from the closure and wherein the valve means includes a plug on the closure that enters and closes the passage when the cup-like element is pushed toward the closure.

4. The combination according to claim 3 where the cup-like element includes a flange extending laterally outwardly with respect to the direction of movement of the element, thereby to facilitate opening the bottle by engaging the flange with the teeth.

5. The combination claimed in claim 1 wherein the hook element is on the mount and the loop element is on the receptacle.

6. The combination claimed in claim 5 wherein the loop element is adhesively affixed to the receptacle surface and the edges of the loop element are bounded by a shoulder to protect them from peeling from the receptacle surface.

7. The combination claimed in claim 5 wherein the loop element is adhesively affixed to the concave surface of the mount and the edges of the loop element are bounded by a shoulder to protect them from peeling from the surface.

8. The combination claimed in claim 1 wherein the means for fastening the mount to the bicycle includes a ring adapted to wrap around a tube, the ring and surface-defining means of the mount are portions of a single piece, the ring being a flexible band and the surface-defining means being a pair of curved plates connected integrally to the respective ends of the band, and further includes a screw passing through portions of the piece adjacent the band and a nut threaded onto the screw to tighten the band on the tube.

9. The combination claimed in claim 1 wherein the means for fastening the mount to the bicycle includes a flange on the underside of the means defining a concave surface, recesses on the underside of the flange adapted to receive threaded bosses on a bicycle down tube and screws passing through holes in the flange and adapted to be threaded into the bosses.

* * * * *